3,157,617
NITRILE-CONTAINING POLYCARBONATE
Richard Butterworth, Manor Township, Lancaster County, and John A. Parker, Lancaster Township, Lancaster County, Pa., assignors to Armstrong Cork Company, Lancaster, Pa., a corporation of Pennsylvania
No Drawing. Filed Nov. 1, 1960, Ser. No. 66,437
9 Claims. (Cl. 260—47)

This invention relates to polycarbonates, and more particularly to polycarbonates possessing a nitrile group. Still more particularly the invention relates to nitrile-containing polycarbonates which cure on the application of heat.

A wide variety of bis-phenols and phosgene have been used as starting materials for polycarbonates in the past. However, there remains a need for polycarbonate films, coatings, binders and molded articles which are high-melting and thermosetting. Such polycarbonate articles must not develop crystallization during the normal wear and tear of use. Crystallization imparts undesirable cloudy appearances to polycarbonate articles and is highly undesirable.

It is a primary object of the present invention to present improved polycarbonates possessing enhanced optical properties. It is a further object to present a polycarbonate possessing an unusually high melting point. It is still a further object of the present invention to present improved linear and three-dimensional polycarbonates.

These objects are accomplished in a surprisingly effective and straightforward manner. The invention contemplates forming a polycarbonate by reacting phosgene at a temperature in the range of minus 20° C. to plus 60° C. in the presence of a non-reactive, acid-accepting medium with a 4,4-bis-(4-hydroxyl phenyl) alkylamide.

The bis-phenol which serves as the starting material for the present invention is a bis-(4-hydroxyl phenyl) alkylideneamide. The alkylidene group may contain from 2 to 8 carbon atoms and will thus constitute the amides of acetic acid through caprylic acid. These amides are readily formed by ammonolysis of the methyl ester of the particular diphenolic acid compound. Thus the amide will have the general formula

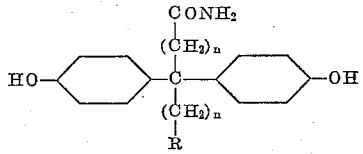

The amide is taken up in an acid-accepting, non-reactive solvent medium such as pyridine, quinoline, pyridine-methylene chloride mixtures, and alkali-containing solvents such as chloroform, dioxane, and tetrahydrofuran. Water can be used to form an aqueous emulsion of the finished polycarbonate if the end product is destined for use wherein the polycarbonate in the form of a gel is not objectionable. This bis-phenol amide is taken up in the reaction medium to an extent of about 2% to 60% by weight. Solvents which are inert to the reactants such as acetone, ether, benzene or the like may also be used provided they contain an alkaline compound to serve as an acid acceptor.

Once the bis-phenol amide has been taken up in a solvent, phosgene is passed into the reaction medium in order to form the polycarbonate and in order to dehydrate the bis-phenol amide to the corresponding nitrile. Two moles of phosgene are needed for every mole of the bis-phenol amide. The temperature of the reaction should be maintained in the range of about minus 20° C. to plus 60° C. for good yields. Reaction times are longer at lower temperatures. The preferred temperature range is 0°–35° C.

The period of reaction generally runs from a few minutes up to a few hours, for example, 5 minutes to 10 hours. Reaction is considered completely when the requisite 2 moles of phosgene have been used for each mole of the diphenol amide.

The nitrile-containing polycarbonate may be recovered as a powder or it may be left in solution, depending on the desired end use. The solution may be sprayed, painted, wiped, or otherwise coated on any desired surface. The solvent will evaporate by mere exposure to the air or by the application of heat, and the polycarbonate will be left as a film. Cross-linking may be accomplished by heating the film to elevated temperatures of 150° C. and higher, longer times being required at lower temperatures. For example, curing is accomplished in some cases in 4 hours at 150° C., while 15 minutes at 250° C. suffices.

The nitrile-containing polycarbonate may be isolated from the reaction mixture as fine, white powders by the addition of strongly polar solvents such as methyl alcohol. The powder may be taken up in the usual solvents, for example, methylene chloride, tetrahydrofuran and dimethyl formamide, to form a pure solution if desired. The powdered polycarbonate itself will serve as a binder for inorganic filler materials in the manufacture of surface coverings.

The formula for the finished polycarbonate is as follows:

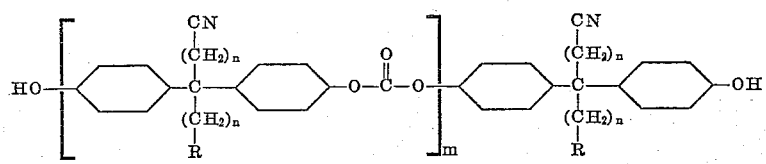

wherein R is hydrogen or an alkyl group containing 1–6 carbon atoms, $n$ is a number from 0 to 6, and the alkylideneamide group contains 2–8 carbon atoms.

wherein R is hydrogen or an alkyl group containing 1–6 carbon atoms, $n$ is a number from 0 to 6, the alkylideneamide group containing 2–8 carbon atoms, and $m$ is a number sufficient to impart a molecular weight to the polycarbonate of 25,000 to 500,000.

The properties of the above-described nitrile-containing polycarbonate may be modified by copolymerizing the bis-phenol amide with a bis-phenol compound of the class

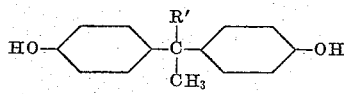

wherein R' equals —CH₃ or —CH₂CH₂COOR'', wherein R'' is an alkyl group containing 1–8 carbon atoms.

The amount of the co-monomer will be in the range of 5–95 mole percent based on the total moles of the bis-phenol amide and the bis-phenol co-monomer. Increasing amounts of the bis-phenol co-monomer decrease the melting points of the resulting polycarbonate containing nitrile groups with the attendant ease of processing of the finished polycarbonate product. Additionally, increasing amounts of the bis-phenol co-monomer may decrease or increase the cross-linking temperature of the final nitrile-containing polycarbonate.

Where the bis-phenol co-monomer is to be used, it is simply added to the reaction medium along with the bis-phenol amide and the reaction is carried out in the usual manner. Since no dehydration of the bis-phenol co-monomer is necessary, 2 moles of phosgene per mole of the bis-phenol co-monomer is unnecessary; 1 mole of phosgene per mole of bis-phenol co-monomer suffices for completion of the reaction. It must be emphasized, however, that 2 moles of phosgene per 1 mole of all the bis-phenol amide used will still be necessary.

The following examples illustrate several embodiments of the invention. All parts are by weight unless otherwise stated.

Example 1

Into a 3-necked 500 cc. flask fitted with gas inlet and gas outlet tube, stirrer, and thermometer, were placed 14.5 parts of the purified compound 4,4-bis-(4-hydroxyl phenyl) valeramide and 125 parts of pyridine. Into the stirred mixture maintained at 20° C. was passed phosgene over a period of 45 minutes. The reaction used 41 parts of phosgene in all.

The reacted solution was poured into a beaker containing ice and 165 parts of methylene chloride, and was neutralized with concentrated hydrochloric acid. The methylene chloride solution of polymer was washed twice with water. The polymer was obtained as a granular solid by the addition of methyl alcohol in a Waring Blendor.

The resin had a minimum film-forming temperature of 185° C. Solutions of the resin in methylene chloride were cast into films possessing tensile strengths of 8,000 p.s.i. and an elongation of 70%. The films also possessed excellent optical properties of clarity and high gloss. A film heated at 180° C. for 8 hours was rendered insoluble in methylene chloride.

An infrared spectrograph on the cast film showed no amide carbonyl bonds. Nitrile bonds were present. After acidic hydrolysis with hydrochloric acid in dioxane and water, the amide carbonyl bonds reappeared in the infrared spectrograph. No nitrile bonds were present in the starting bis-phenol amide.

Example 2

Into a three-necked flask equipped with stirrer, thermometer, and gas inlet and outlet tube, were placed 17 parts of 2,2-(4-hydroxyl phenyl) propane, 24 parts 4,4-bis-(4-hydroxyl phenyl) pentanamide, 125 parts pyridine, and 495 parts methylene chloride. The mixture was stirred, and 36 parts of phosgene was added over a period of 12 minutes while the temperature was maintained at 20° C.

The reaction mixture was poured into ice water and neutralized with hydrochloric acid, and was then washed twice with an equal volume of water. The polymer was precipitated from the solution by the addition of methyl alcohol.

The polymer was redissolved in methylene chloride as a solvent and formed clear films when cast from the solution. The polymer had an intrinsic viscosity of 0.45. The dried powder softened at 170° C. sufficiently that the particles adhered to one another.

Example 3

A polymer was made as in Example 1 from 8 parts of 4,4-bis-(4-hydroxyl phenyl) pentanamide, 32 parts of 2,2-bis-(4-hydroxyl phenyl) propane, 125 parts pyridine, 495 parts methylene chloride, and 23 parts phosgene.

The resulting polymer had an intrinsic viscosity of 0.35 and a film-forming temperature of 160° C.

Example 4

As in Example 2, a polymer was made from 25 parts methyl 4,4-bis-(4-hydroxyl phenyl) pentanate, 24 parts 4,4-bis-(4-hydroxyl phenyl) pentanamide, 125 parts pyridine, 495 parts methylene chloride, and 33 parts phosgene.

The resulting polymer had an intrinsic viscosity of 0.78 and a film-forming temperature of 165° C.

Example 5

As in Example 2, a polymer was made with 13 parts 2,2-bis-(4-hydroxy phenyl) propane, 17 parts methyl 4,4-bis-(4-hydroxyl phenyl) penanate, 16 parts 4,4-bis-(4-hydroxyl phenyl) pentanamide, 125 parts pyridine, 495 parts methylene chloride, and 37 parts phosgene.

The resulting polymer had an intrinsic viscosity of 0.50 and could be cast into clear, flexible films from solution.

We claim:

1. The method of forming a polymeric polycarbonate comprising reacting phosgene at a temperature in the range of minus 20° C. to plus 60° C. in the presence of an inert acid-accepting medium with a diphenolic acid amide of the formula

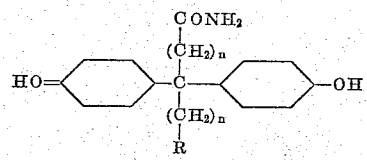

wherein R is selected from the group consisting of hydrogen and an alkyl group containing 1–6 carbon atoms, n is a number from 0 to 6, and the alkylideneamide group contains 2–8 carbon atoms, sufficient phosgene being reacted to form a polycarbonate from said alkylideneamide, and to convert the amide group on said alkylideneamide to a nitrile group.

2. The method according to claim 1 wherein said inert medium comprises pyridine.

3. The method of forming a polymeric polycarbonate comprising reacting phosgene at a temperature in the range of minus 20° C. to plus 60° C. in the presence of an inert acid-accepting medium with 4,4-bis-(4-hydroxyl phenyl) valeramide, sufficient phosgene being reacted to form a polycarbonate from said valeramide and to convert the amide group on said valeramide to a nitrile group.

4. The method of forming a polymeric polycarbonate comprising reacting phosgene at a temperature in the range of minus 20° C. to plus 60° C. in the presence of an inert acid-accepting medium with a mixture of bis-phenols containing at least 5 mole percent of a bis-(4-hydroxyl phenyl) alkylideneamide, the balance being a bis-phenol co-monomer of the general formula

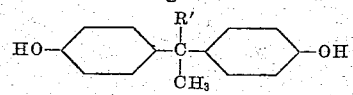

wherein R' is selected from the group consisting of —CH₃ and —CH₂CH₂COOR'', and R'' is an alkyl group containing one to 8 carbon atoms, sufficient phosgene being reacted to form a polycarbonate from said alkylidene- 8. A polycarbonate having the formula

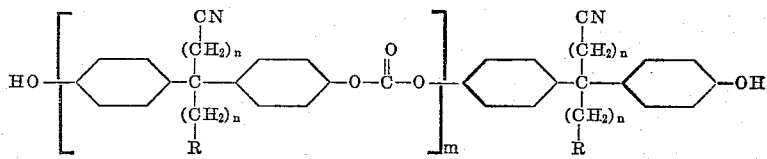

wherein R is selected from the group consisting of hydrogen and an alkyl group containing 1–6 carbon atoms, $n$ is a number from 0 to 6, and $m$ is a number sufficient to impart a molecular weight to the polycarbonate of 25,000 to 500,000.

9. A polycarbonate having the formula

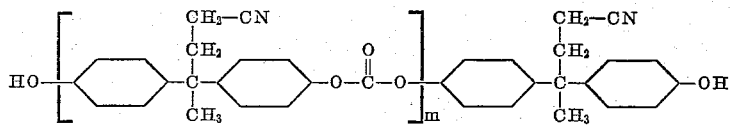

wherein $m$ is a number sufficient to impart a molecular weight to the polycarbonate of 25,000 to 500,000.

5. A method according to claim 4 wherein said bisphenol co-monomer comprises 2,2-bis-(4-hydroxyl phenyl) propane.

6. A method according to claim 4 wherein said bisphenol co-monomer comprises a 4,4-bis-(4-hydroxyl phenyl) pentanoic acid ester.

7. A polymeric polycarbonate containing at least 5 mole percent of the following radical

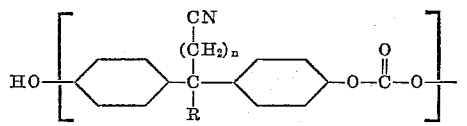

wherein R is selected from the group consisting of hydrogen and alkyl groups containing 1–6 carbon atoms, $n$ is a number from 0 to 6, and the remainder of the molecule consists of alternating carbonate groups and bis-phenol groups.

References Cited in the file of this patent

UNITED STATES PATENTS

| | | |
|---|---|---|
| 2,206,351 | Greenhalgh | July 2, 1940 |
| 2,907,740 | Greenlee | Oct. 6, 1959 |
| 2,933,528 | Greenlee | Apr. 19, 1960 |
| 2,950,266 | Goldblum | Aug. 23, 1960 |

FOREIGN PATENTS

| | | |
|---|---|---|
| 828,703 | Great Britain | Feb. 24, 1960 |